Figure 1:
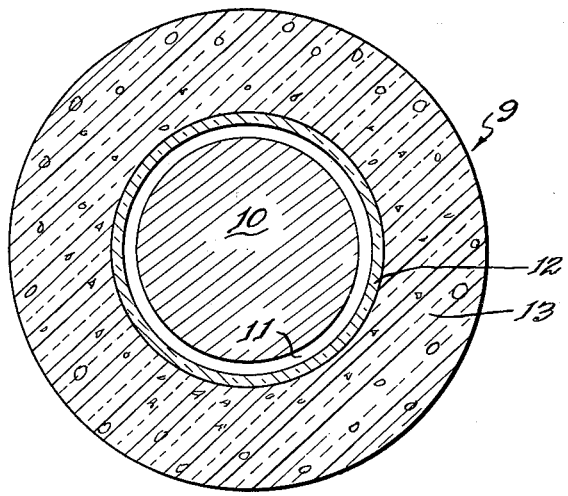

May 3, 1966

J. M. BLOCHER, JR 3,249,509

NUCLEAR FUEL PARTICLES COATED WITH MIXTURE
OF PYROLYTIC CARBON AND SILICON CARBIDE

Filed Dec. 10, 1964

INVENTOR.
John M. Blocher, Jr.
BY
Roland G. Anderson
Attorney

United States Patent Office 3,249,509
Patented May 3, 1966

3,249,509
NUCLEAR FUEL PARTICLES COATED WITH MIXTURE OF PYROLYTIC CARBON AND SILICON CARBIDE
John M. Blocher, Jr., Columbus, Ohio, assignor to the United States of America as represented by the United States Atomic Energy Commission
Filed Dec. 10, 1964, Ser. No. 419,273
4 Claims. (Cl. 176—67)

The invention described herein was made in the course of, or under, a contract with the United States Atomic Energy Commission.

The invention relates to a novel improved coated nuclear reactor fuel particle and to a method of making the same.

Graphite or pyrolyzed-carbon-coated nuclear-reactor-fuel particles offer many advantages, as compared to uncoated fuel particles, or to fuel in large shapes such as those in reactors of early design. Foremost among such advantages is the efficient containment of fission product gases; it has never been possible to encase large shapes in non-metallic cladding securely enough to overcome entirely the tendency of the latter to swell and rupture when the pressure from such gases rises during reactor operation or from other sources of stress. Consequently, subdivision of the fuel into small particles is now being investigated as a means of solving the problem of fission product containment; the mechanical stress on the containing means is thereby reduced, especially when the particles and their containing means are in spherical shape.

Among the various particle-containing means that have been suggested, pyrolytic carbon coatings have several unique points in their favor. They provide, in addition to fission product containment, a neutron moderator means in the carbon itself, chemical inertness and resistance to corrosion, good heat transfer from the fuel to the gas or liquid coolant, and adaptability to being incorporated into metallic or nonmetallic matrices without undesirable alloying phenomena.

However, up until the present, all attempts at using pyrolyzed carbon for the purpose mentioned have been less than completely satisfactory. Under otherwise desirable production conditions, the carbon has tended to deposit in somewhat irregular roughly concentric layers, between which there is a lack of strength. This structure, which is known as "onion skin," is shown by the tendency of cracks to propagate circumferentially from any damaged area, and at times large sections of a layer flake off in a single piece. To the extent that the individual crystallites are preferentially oriented, the layers will have a substantial isotropic difference in their coefficients of expansion in the circumferential direction and in the radial direction the ratio between these being about 20 to 1. This predisposes the layers to separate when subjected to stress of differential thermal expansion in nuclear reactors, and while the physical effects of this are not always evident, the ability of the coatings to retain fission products is impaired.

Other available methods for laying down pyrolytic carbon coatings result in columnar deposits where the grain boundaries are largely radial. This is a strong structure in compression, but the radial boundaries are weak points in tension, as is encountered in reactor use, at least in part due to internal fission gas generation.

It is, accordingly, an object of the invention to provide an improved pyrolyzed carbon coating for nuclear fuel particles.

It is another object to provide a method of making such an improved coating.

Other objects will appear as the description of the invention proceeds.

The foregoing objects are obtained by my discovery that the simultaneous deposition of pyrolytic carbon and silicon under conditions such that the silicon is converted to silicon carbide, results in an improved coating having increased crushing strength and fission product retention. No complete theoretical explanation has as yet been established for this phenomenon, and my invention is therefore offered entirely on the basis of my empirical findings resulting from actual experimentation.

Figure 2:
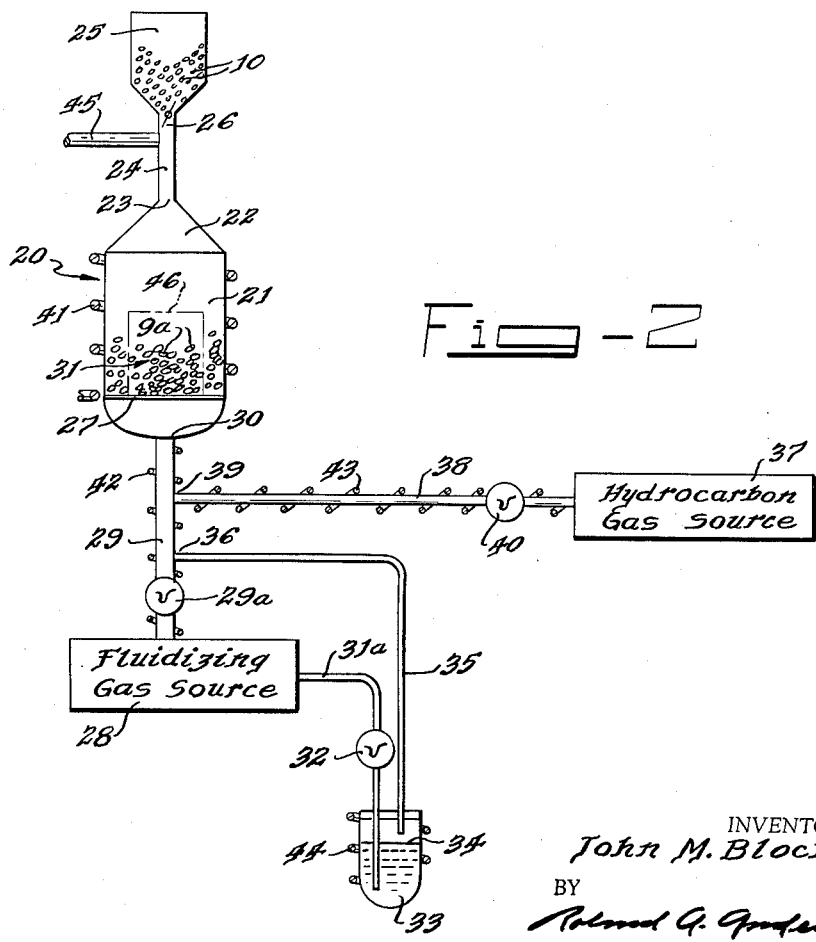

Attention is now directed to the drawings, FIG. 1 of which shows a cross-sectional view of a preferred embodiment of the product of the invention, and FIG. 2 is a schematic sectional view of the apparatus used to produce it.

Referring to FIG. 1, the numeral 9 refers to the coated fuel particle of the invention generally. The numeral 10 refers to a central particle, or core, of fissionable fuel material, in this case uranium carbide. Core 10 and the concentric coated fuel particle 9 are sectioned through their common center in the view of FIG. 1. Core 10 may also be any of the other fuel materials such as metallic uranium or plutonium, or the oxides, nitrides, sulfides, carbides and the like of those metals. The core 10 may also be a fertile material rather than a fuel such as natural uranium, uranium depleted in the 235 isotope, uranium 238, thorium and the like; these are for use in the "blankets" of "breeder" reactors.

Immediately and concentrically surrounding the core 10 is a void space 11, which is due to the differential in thermal expansions of the core 10 and the coating surrounding it, and which results naturally from the method of making which will be described later on. While this void space 11 is not strictly necessary for the invention, it is certainly preferable to have it since it provides an expansion space for fission product gases and thereby greatly reduces the stress on the coating. Consequently, the production of this space should be considered an important incidental advantage of the invention.

Concentrically surrounding void space 11 is a layer 12 of essentially pure pyrolyzed carbon. Surrounding the outside of layer 12 is the layer 13 of pyrolytic carbon containing silicon carbide, which may contain from about 1% to about 25% silicon carbide, with a preferred range of from 1.5 to 5%. The islands of carbide shown in FIG. 1 are symbolic only and carry no inference to the size of any second phase.

Referring to FIG. 2, the numeral 20 designates generally a fluidized bed reactor in which the method of making the coated fuel particle of the invention is carried out. It has a cylindrical reactor vessel 21 with an upwardly tapered top 22, a solids charging port 23 leading to a conduit 24 in communication with a bin 25 where the fuel cores 10 are stored. Valve 26 may be opened to admit solids into the vessel 21.

Near the bottom of the vessel 21 is perforated plate 27 of a mesh sufficiently fine to prevent any of the solids in the vessel 21 from falling through it. Fluidized gas source 28 furnishes a fluidizing gas such as argon, helium, and the like through main gas conduit 29 to vessel 21 at 30. The gas, the flow of which is regulated by valve 29a, maintains the fluidized bed 31 of particles 9a in a fluidized condition. It is to be understood, of course, that the numeral 9a refers to the particles during the process which culminates in the production of the completed article 9.

A side stream conduit 31a of substantially smaller size and capacity than the main gas conduit 29, leads from fluidizing gas source 28 through control valve 32 to vessel 33. Vessel 33 contains liquid silicon tetrachloride 34. The side stream of fluidizing gas bubbles through liquid 34 and entrains its vapor. The entrained mixture then passes out through line 35 which enters vessel 21, in this case by way of main conduit 29 at 36.

Hydrocarbon gas source 37 furnishes a decomposable hydrocarbon gas, such as methane, ethane, acetylene and the like, through line 38 to main conduit 29 at 39. The flow of gas in line 38 is regulated by valve 40.

Induction coil 41 surrounds vessel 21 coaxially, and is one of several types of heating means that may be used to maintain the temperature of the reactor 20. Heating coil 42 serves as the preheater for the fluidizing gas in conduit 29; heating coil 43 serves as the preheater for the hydrocarbon gas in line 38. Cooling coil 44 around vessel 33 maintains a uniform temperature of the liquid 34, thereby making constant the concentration of its vapor in the entrained mixture leaving through line 35.

Off-gas line 45 leads from conduit 24 to filters, a stack or other gas disposal means which, since they do not constitute a part of the invention, are not shown. The vessel 21 has a solids-discharging door shown in phantom at 46.

Much of the operation of the reactor will be determined by such factors as size of the reactor, size of the particle being coated, thickness and density of the coatings varies within the temperature range mentioned; nature; it has been found that between 950° and 2000° at 950° C. the density is about 1.91 grams per cm.$^3$ and at higher temperatures the density decreases to a minimum value of 1.50 gm. per cm.$^3$ at 1500° C.; thereafter at higher temperatures the density rises and at 1800° C. is 1.94 gm. per cm.$^3$.

In general, the rate of the hydrocarbon gas flow should be from about 5 to 15 percent of the fluidizing gas flow my preferred rate for acetylene being about 11 percent. The rate of the side stream fluidizing gas flow will depend on the temperature of the liquid 34, its partial pressure characteristics in the side stream gas, and the target carbide level desired. I have found that for a target silicon carbide level of 2.5 a/o (atom percent) silicon, a side stream of helium going through $SiCl_4$ at 0° C. should have a rate of about 150 cc./min.; for a target level of 5 a/o about 300 cc./min., and for a target level of 10 a/o about 600 cc./min. It is not necessary that the target carbide levels be attained exactly since there is no stoichiometry involved, but only the physical strengthening of the coating as a whole, and this permits considerable latitude. The carbide is preferably silicon carbide, which is believed to be substantially all in the second phase material.

It may also be desirable to vary the silicon coating during deposition by varying the silicon input, such that there is a gradation in silicon content radially outward.

EXAMPLE

Six lots of spherical $UC_2$ particles were processed in a one inch diameter refractory ceramic fluidized bed essentially of the type illustrated in FIGURE 2. The reactor temperature was 1400° C., the fluidizing gas helium, the reactant gases either acetylene and $SiCl_4$ or a single dual-function gas $CH_3SiCl_3$. Two other lots were treated with acetylene only. These functioned as control lots. The preparation conditions and product data are displayed in Table I.

*Table I*

PREPARATION CONDITIONS AND PROPERTIES OF COATED PARTICLES

| Lot No. | Substrate | Coating reactants,[1] mole percent | Coating temp.,[1] °C. | Total gas flow,[1] cc./min. STP | Carbon deposition efficiency,[1] percent | Coating growth rate, μ/hr. | Coating density, g./cc. | Coating structures |
|---|---|---|---|---|---|---|---|---|
| 16564-53-14 | $UC^2$ | He, 90.4; $C_2H_2$, 9.0; $SiCl_4$, 0.6. | 1,400 | 3,300 | 85 | 36 | 1.81 | 20μ PyC.[2] 20μ ~1.9 w/o Si in PyC.[2] 20μ ~3.9 w/o Si in PyC.[2] 20μ ~7.7 w/o Si in PyC.[2] |
| 514A | $UC^2$ | He, 95.5; $C_2H_2$, 4.1; $SiCl_4$, 0.2. | 1,400 | 1,770 | 63 | 22 | 1.88 | 4μ PyC.[3] 34μ ~1.5 w/o Si in PyC.[3] |
| 516 | $UC^2$ plus coke | He, 93.5; $C_2H_2$, 5.2; $SiCl_4$, 1.3. | 1,400 | 1,810 | (~100) | 31 | 1.77 | 7μ PyC.[3] 47μ 1.7 w/o Si in PyC.[3] |
| 532 | $UC^2$ plus coke | He, 95.0; $C_2H_2$, 2.9; $CH_3SiCl_3$, 2.1. | 1,400 | 3,900 | 85 | 46 | | 5μ PyC. 48μ PyC 13.3 w/o Si. |
| 540 | $UC^2$ plus coke | He, 97.3; $CH_3SiCl_3$, 2.7 | 1,400 | 3,900 | 79 | 17 | 1.84 | 2μ PyC. 55μ PyC, 15.6 w/o Si. |
| 918A | $UC^2$ | He, 98.7; $C_2H_2$, 1.3 | 1,400 | 3,750 | 38 | 6 | 1.73 | 56μ PyC.[3] |
| 919A | $UC^2$ | He, 93.8; $C_2H_2$, 6.2 | 1,400 | 3,750 | 67 | 48 | 1.54 | 70μ PyC.[2] |

[1] Average during doping (or during 100% PyC deposition in runs 918A and 919A).
[2] Laminar.
[3] Columnar.

ing desired, depth of the fluidized bed and the like. These factors determine, for example, the duration and rate of flow of the fluidizing gas, which should be sufficient to maintain the bed in the desired fluidized condition. Reaction temperature, however, is more of a critical C. satisfactory pyrolytic graphite coating may be applied to fuel core particles, the term graphite here being exchangeable with pyrolytic carbon, since all such coatings have a graphite character. It has been further found that, other conditions being constant, the density of the Certain randomly selected samples of each batch were subjected to a standard crushing strength test, the results of which are to be found in Table II. It is to be noted that there was some deviation in coating thickness. The samples were divided into two lots and the results "normalized" to the same thickness by applying a linear correction. It will be seen that in all cases there is an appreciable increase in crushing strength. In three cases this improvement is larger than 35%. In lot 16564-53-14 the improvement was 27%.

Table II
CRUSHING STRENGTH AT INDIVIDUAL PyC-COATED PARTICLES AS A FUNCTION OF SILICON CONTENT

| Lot No. | Coating thickness, μ | w/o Si | Crushing strength, g. Measured | Crushing strength, g. Normalized [1] |
|---|---|---|---|---|
| 918A | 56μ PyC | 0 | 860 | 860 |
| 514A | 5μ PyC plus 45μ doped PyC | ~1.5 | 840 | 940 |
| 516 | 7μ PyC plus 47μ doped PyC | 1.7 | 1,130 | 1,170 |
| 532 | 5μ PyC plus 48μ doped PyC | 13.3 | 1,140 | 1,200 |
| 540 | 2μ PyC plus 55μ doped PyC | 15.6 | 1,330 | 1,310 |
| 919A | 70μ PyC | 0 | 1,130 | 1,130 |
| 16564-53-14 | 20μ PyC plus 60μ doped PyC | [2] 4.3 | 1,645 | 1,440 |

[1] Linear correction to 56μ for comparison with 918A and to 70μ for comparison with 919A (other data show linear correction valid within these limited ranges).
[2] Average.

Table III below suggests that the mechanism by which the improved properties are obtained is one of catalysis of the pyrolytic carbon deposition reaction. The following points support this position.

(a) During deposition with silicon halide additions, the off gases from the coating reactor are less sooty than when the hydrocarbon alone is used.

(b) The doped coatings tend toward a columnar appearance, i.e., they apparently contain fewer inclusions of the sooty or soft material associated with the formation of the laminations visible at 100X.

(c) The density appears to be on the high side of what one would expect with no addition and at comparable rates of deposition.

Table III
EFFECT OF SILICON ADDITIONS ON DEPOSITION EFFICIENCY AND COATING DENSITY

| Lot No. | w/o Si in coating | Deposition rate, μ/hr. | Deposition efficiency,[1] percent | Density, g./cc. |
|---|---|---|---|---|
| 918A | 0 | 6 | 38 | 1.73 |
| 919A | 0 | 48 | 67 | 1.54 |
| 16564-53-14 | [2] 4.3 | 36 | 85 | 1.81 |
| 514A | 1.5 | 22 | 63 | 1.88 |
| 516 | 1.7 | 31 | (~100) | 1.77 |
| 532 | 13 | 46 | 85 | |
| 540 | 15.6 | 17 | 79 | |

[1] Fraction of available carbon deposited as coating on particles.
[2] Average concentration over entire coating.

Further tests were made by cutting into the coatings with a scribe. The cracks emanated from the damaged area, rather than following the contour or circumference of the particle as occurs in particles having "onion skin" coatings not modified according to this invention. This is believed to show the coatings according to this invention are less anistropic than unmodified coatings.

It has been found that graphite coatings leak radioactive barium, strontium, neodymium, cesium and other fission products, presumably by recoil followed by diffusion. The codeposition of small amounts of $SiO_2$ in a pyrolytic carbon coating markedly decreases this leakage. The coated particles of the present invention also have this property.

It is to be understood that this invention is not to be limited to the details given herein, but that it may be modified within the scope of the appended claims.

The embodiments of the invention in which an exclusive property or privilege is claimed are defined as follows:

1. A coated nuclear blanket particle comprising a core of ceramic fertile material and, concentrically surrounding it, a plurality of layers of pyrolyzed graphitic carbon having outwardly increasing levels of silicon carbide.

2. A coated nuclear fuel particle comprising a core of ceramic fissionable fuel material, and concentrically surrounding it, a layer of substantially pure pyrolyzed carbon, and a layer of pyrolyzed carbon containing silicon carbide, the core and the layer of substantially pure pyrolyzed carbon being so arranged as to define a void space therebetween.

3. The coated particle of claim 2 where the content of silicon carbide in the outer pyrolytic carbon layer lies between 1½ and 16%, by weight.

4. A coated nuclear reactor fuel particle comprising a core of fissionable fuel material and, concentrically surrounding it, a layer of substantially pure pyrolyzed carbon, and a plurality of layers of pyrolyzed carbon having outwardly increasing levels of silicon carbide, the core and the layer of substantially pure pyrolyzed carbon being so arranged as to define a void space therebetween.

References Cited by the Examiner
UNITED STATES PATENTS

| | | | |
|---|---|---|---|
| 2,907,299 | 8/1959 | Weiner | 118—309 |
| 2,990,807 | 8/1961 | Gerow | 118—48 |
| 3,079,316 | 2/1963 | Johnson | 176—69 |
| 3,089,785 | 5/1963 | Lewis et al. | 117—71 |
| 3,121,047 | 2/1964 | Stoughton et al. | 176—69 |
| 3,151,037 | 9/1964 | Johnson et al. | 176—67 |
| 3,165,422 | 1/1965 | Stoughton et al. | 117—100 |
| 3,166,614 | 1/1965 | Taylor | 176—91 X |

OTHER REFERENCES

Reactor Materials, vol. 6, No. 2, May 1963, page 30.
Reactor Materials, vol. 6, No. 3, August 1963, page 21.
TID–7654 (AEC Document), November 1962, pages 329 and 332.

LEON D. ROSDOL, *Primary Examiner.*

L. DEWAYNE RUTLEDGE, *Examiner.*